United States Patent Office 3,410,708
Patented Nov. 12, 1968

3,410,708
POROUS SILICA COATED TITANIUM
DIOXIDE PIGMENT
William J. McGinnis, Waverly, Tenn., assignor to E. I. du Pont de Nemours and Company, Wilmington, Del., a corporation of Delaware
No Drawing. Filed Aug. 5, 1964, Ser. No. 387,790
8 Claims. (Cl. 106—300)

ABSTRACT OF THE DISCLOSURE

A chalk resistant, highly weatherable co-oxidized $TiO_2$-$Al_2O_3$ pigment bearing 2–5% by weight (based on $TiO_2$) of a porous $SiO_2$ coating formed by adding a water soluble silicate to a warm (40–70° C.), mildly acidic, co-oxidized $TiO_2$-$Al_2O_3$, aging the resulting hot alkaline product, adjusting the pH to not exceed 6.5 and aging the hot acidified product for 20–60 minutes.

---

This invention relates to titanium dioxide pigments and more particularly to the production of improved aluminum oxide-containing $TiO_2$ pigments derived from the co-oxidation of titanium tetrachloride and aluminum chloride.

$Al_2O_3$-containing $TiO_2$ white pigments are well-known and adaptable for use in various pigmenting applications, including coating compositions, such as paints, enamels and lacquers, and as delusterants for artificial fibers such as rayon, nylon, etc. They can be prepared in accordance with the procedures disclosed in U.S. Patent 2,559,638, wherein $TiCl_4$ and controlled, small amounts of $AlCl_3$ are co-oxidized with air or oxygen at a relatively high temperature ranging from about 800 to 1,350° C. The resulting product comprises a soft-textured pigment in uniform, small particle size, with an average particle size radius in the range of from 0.05 to 0.5 microns and preferably from .1 to .25 microns. $Al_2O_3$ present in the pigment as an essential ingredient ranges from about .1 to 10%, and preferably ranges from 0.5 to 3.5% by weight, based on the $TiO_2$.

It has now been found that the gloss, chalk resistance and weatherability characteristics of this pigment can be enhanced and improved if the product emitted from the oxidation reactor of the flame process is wet treated with sufficient porous silica ($SiO_2$) to effect a complete coating of the pigment particles and preferably in amounts ranging from about 2–5% by weight of the finished pigment.

In effecting such treatment recourse is had to the following process steps:

(1) The $TiO_2$-$Al_2O_3$ product from the $TiCl_4$-$AlCl_3$ oxidation is directly quenched upon discharge from the reactor by mixing the product with water to form an aqueous slurry containing from 20–40% $TiO_2$-$Al_2O_3$ by weight.

(2) The resulting slurry is then heated to temperatures within a range of from 40 to 70° C.

(3) An alkali metal silicate, such as sodium silicate ($Na_2$-$SiO_3$) is rapidly mixed with said slurry and in quantities equivalent to from 1–25% $SiO_2$ based on the weight of the dry $TiO_2$ pigment being treated.

(4) The sodium silicate-treated slurry is then held at said 40–70° C. temperatures with accompanying agitation for a period of about 30 minutes in order to effect desired aging or conditioning of the slurry.

(5) Thereafter the pH of the heated and aged slurry is adjusted through sufficient acid addition to a pH in the range of from 6–6.5.

(6) The neutralized slurry thus obtained is then held for an additional period of about 30 minutes with agitation at said 40–70° C., after which it is conventionally filtered and the treated pigment is dried and ground to break up undesired agglomerates.

As noted this invention entails a wet process for producing a porous silicate coating on $TiO_2$-$Al_2O_3$ pigments. This can be conveniently brought about by forming an aqueous pigment slurry containing 20–40% $TiO_2$-$Al_2O_3$ pigment, by weight, by directly discharging and quenching the pigment in water in a suitable corrosion resistant vessel such as a wooden, glass or plastic-lined tank, as it is emitted from the oxidation reactor or the cooling or calcining equipment. The use of more dilute or concentrated slurries is avoided since they fail to produce the desired final $SiO_2$ form of coating herein contemplated.

Slurries made up from calciner discharge are usually neutral, whereas those prepared directly from reactor discharge are usually mildly acidic and in a pH range of from 2–6. A neutral form of slurry can be readily adjusted to the desired 2–6 pH range by adding thereto a sufficient concentration of mineral acid prior to alkali silicate and $SiO_2$ treatment. The choice of mineral acid utilized is relatively important in the process since the type and nature of the $SiO_2$ coating ultimately obtained will be found to depend upon the acid used. Thus, chalk-fade resistance in exterior paint films will be found to increase in the sequence of the following acids used:

$$H_3PO_4 < H_2SO < HCl < HNO_3$$

with the latter two acids being about 3 times better than and hence preferred over use of the first two acids. For certain applications where gloss characteristics are more critical and important than chalking properties, recourse to sulfuric acid or hydrochloric acid is preferred. This difference in the physical nature of the $SiO_2$ coating obtained with the use of solutions acidified with the various, different mineral acids mentioned is not presently clearly understood.

Following acidification, should this be necessary to provide such 2–6 pH range, heating of the slurry to a temperature in the range of from 40° C. to 70° C. and preferably to about 60° C.±5° C. is undertaken. Since temperatures in excess of 70° C. tend to form undesired denser silica coatings on the pigment particles, such excessive temperatures are avoided, as are temperatures below 40° C. which induce an undesired slow reaction rate.

The hot 40–70° C. slurry is then mixed with a solution of an alkali metal silicate, preferably sodium silicate ($Na_2SiO_3$), containing in the range of from 100–400 gms./liter of $SiO_2$. Such mixing is quickly effected and with accompanying mild agitation of the slurry by means of conventional stirring equipment. Addition of the silicate solution is continued until the amount of $SiO_2$ present in the mixture is equivalent to from 1–25% of the weight of the $TiO_2$–$Al_2O_3$ pigment, and preferably ranges in amount to from 2–5% $SiO_2$ by weight. On completion of silicate addition, the pH of the silicate-$TiO_2$ slurry should be at least 9 and may range up to pH 11, depending upon the amount of sodium silicate utilized. Agitation is continued for about 30 minutes after silicate introduction, and the slurry is then neutralized to a 6–6.5 pH by incorporating therein a sufficient quantity of a suitable mineral acid to result in precipitation and coalescence of $SiO_2$ as a coating completely covering the pigment. The choice of acid employed will, as above noted, bear directly not only on the quality of the coating formed but on the ultimate pigment characteristics of the product obtained.

Upon desired aging of and $SiO_2$ precipitation in the slurry, a further conditioning treatment is undertaken, preferably at a pH of 6–6.5, for an additional 30–60 minutes while maintaining the slurry at 40–70° C. If desired, shorter aging periods, say from about 20–30 minutes or a longer time, and up to about several hours can be resorted to. Thereafter, the treated pigment can be recovered from the slurry by filtration and dried and ground or otherwise conventionally finished to obtain the final pigment. Preferably, the grinding treatment is carried out in a fluid energy mill, using a steam propellant.

To a clearer understanding of the invention the following more specific example is given wherein the parts mentioned are by weight. This is merely illustrative of and is not to be considered as in limitation of the underlying principles and scope of the invention.

EXAMPLE 1

Four 6,000-gram portions of a co-oxidized $TiO_2$-$Al_2O_3$ pigment containing 1.6% $Al_2O_3$, were prepared by following the procedures disclosed in U.S. 2,559,638. Each of the portions thus prepared was separately stirred into 12 liters of cold de-ionized water to form a 33% pigment-water slurry having an initial acidic pH in the range of 2–5. The slurry mixtures thus obtained were then heated to 60° C. and stirred with a standard propeller mixer for 30 minutes while maintained at said temperature. A solution containing 200 grams of $SiO_2$/liter as sodium silicate was then added to three of the above four separately prepared pigment slurries. As a result there was obtained four pigment mixtures containing 0, 120, 300 and 600 grams $SiO_2$, or, respectively, 0%, 2%, 5% and 10% by weight of $SiO_2$. The pH of the $SiO_2$-containing slurries range from 8–11 and the pH of the 0% $SiO_2$ slurry was adjusted to 9 pH by means of NaOH addition. Each pigment mixture was then held at 60° C. for a period of 60 minutes with accompanying mild agitation, and the pH of each slurry was then lowered to 5.5–6.5 through the addition of sufficient sulfuric acid. The acidified slurries were then filtered to recover their pigment products which were then washed and dried at 150° C. and the dried pigments were then ground separately in a fluid energy mill. The resulting finely ground, fine-textured pigments were separately incorporated in standard automotive finishes and paints and tested for gloss and fading properties with the following results being obtained.

| Percent $SiO_2$ | Automotive Gloss Meter Reading | Exterior Chalk Fade Rating 10/20 Scale |
| --- | --- | --- |
| 0 | 68 | 0 |
| 2 | 75 | 20 |
| 5 | 73 | 21 |
| 10 | 69 | 22 |

The values herein given for gloss and chalk fading were determined as follows:

(a) *Gloss testing.*—Paints are prepared from standard $TiO_2$ pigments and the test pigments in a syntex resin, ground on a 5 roll mill at a medium tight setting and then reduced to spraying consistency with resins and thinners. The paints are then applied under controlled conditions and by use of automatic spraying equipment, to aluminum panels which are then baked at 300° F. for 45 minutes. Gloss of the film is then determined instrumentally by measuring the ratio of light reflected from the surface to light incident on the surface when the angles of incidence and reflectance are equal but opposite in sign. That is, it is determined how closely the paint surface resembles a mirror. The angle normally used is 20°. The higher the meter reading the higher the gloss is. By comparing the results with those obtained from standard pigments, a quantitative gloss value is obtained for the pigments being tested.

(b) *Chalk fading and resistance ratings.*—Generally, $TiO_2$ pigments are tested for chalk and fading resistance in an air dried automotive enamel formulation tinted a blue medium and exteriorly exposed at an angle of 45° south exposure in Florida. After a period of time (varying from 1 to 4 months) a white film, known as "chalking" forms on the exposed surface of the panel. This film is composed of titanium dioxide and paint solids which have separated from the paint film due to photochemical decomposition of such film. The rating applied to the amount of this "chalk", as determined by a visual test, compared to the amount on panels containing standard commercial grade $TiO_2$ pigment comprises the chalk-fade determination. This chalk fade scale is set up by considering the pigments under tests as falling under U.S. Federal Specifications developed by the General Services Administration of the Federal Supply Service. Thus, the standard commercial grade rutile $TiO_2$ pigment classed as TT-P-442, IIIA product when applied to a chalk panel can have a value of 20, whereas a standard commercial grade rutile $TiO_2$ pigment would come under TT-P-442 IIIB class and have a rating of 10 on such chalk fade scale.

Chalk fade resistance, which is the difference in appearance betwen the blue unexposed portion of a panel and the white chalk exposed portion, is determined as follows: During exposure, the top 3 inch portion of the panel is covered by a wooden flap and becomes the unexposed control. Visual method for determining the rating of the exposed portion after 3 or 4 months of exposure at Florida, for example, is carried out as follows: One-half of the panel lengthwise is polished with a commercial type automobile polish containing wax and cleaner. This removes the chalk from that half of the panel and makes the remaining chalk standout even more so. Chalk-fade is rated from 10–0 in one-half point increments. A panel rated ten has no visible chalk. A panel rated 0 has a heavy white chalk. Standard control pigments rated 10 and 20 are included in each series and control pigments are also inclded for comparison with the experimental pigments. A 10–20 chalk-fade rating is determined by letting the type IIIA panel equal 20, and the type IIIB panel equal 10 and calculating the 10–20 of the other panels from the relation of their chalk fade rating to that of the type IIIA and type IIIB panels. For example: if the type IIIA panel rated 8 and type IIIB panel rated 4, and panel X noted 6+, chalk-fade on the 10/20 scale would be as follows: IIIA=20, panel IIIB=10, panel X=16.

Although the invention has been described as applied to particular embodiments, it is not, as already noted, limited thereto. Water-soluble alkali metal sodium and potassium silicates are particularly useful, with sodium silicate, containing a $SiO_2$:$Na_2O$ ratio of about 3.8:1 by weight, being especially preferred. In general, however, use is contemplated of the various water-soluble silicates, especially alkali metal silicates, which form soluble acid salts which can be washed out of the pigment as well as mixtures of these silicates. After silicate solution addition to the acidic, mechanically agitated slurry suspension, the pH of the suspension is moderately basic and ranges from pH 9–11. The pigment can be aged in the tank in this basic solution for an hour or so prior to neutralization by mineral or organic (acetic acid) addition. After the pH has been readjusted to 6–6.5, it is further aged for at least 30 minutes prior to filtration and drying. If desired, acidification of the $TiO_2$ suspension to a pH of 1–1.5 or lower can be resorted to prior to the addition of the silicate solution. Again, in the pigment drying operation the temperatures employed are maintained below 200° C. and preferably are within the range of from about 120–140° C.

The temperature and conditions of treatment under which $SiO_2$ coating is effected will be found to affect the porosity of the silica coating applied to the pigment. At relatively higher temperatures (70° C.–100° C.) a more dense type of coating forms on the pigment, while with the use of lower temperatures (40° C.–70° C.), the preferred porous form of coating will result. A porous coating permits penetration by acid into the substrate or $TiO_2$-$Al_2O_3$, base, and a coated pigment is characterized by the ease with which $TiO_2$ is leached therefrom. $TiO_2$-$Al_2O_3$ co-oxidized pigments with a 2–25% silica treatment contain from 0.1% to 0.3% soluble $TiO_2$ and from 0.4% to 0.65% soluble $Al_2O_3$ when treated with 15% sulfuric acid and from 0.3% to 0.8% soluble $TiO_2$ and 0.25%–0.75% soluble $Al_2O_3$ with 50% $H_2SO_4$.

Coating a $TiO_2$-$Al_2O_3$ pigment with silica in accordance with the invention will be found to provide a pigment superior to a product in which a straight $TiO_2$ substrate is treated with an alumina-silicate coating. At low levels of treatment the silica-coated $TiO_2$-$Al_2O_3$ pigment will be found to advantageously exhibit high gloss, low oil absorption and will be relatively inert to render the pigment highly adaptable for use in enamel and reactive systems; that is, it will manifest desired resistance toward yellowing in baked vinyls, will be unreactive in many ink vehicles and resistant toward chalking upon being subjected to accelerated testing. At high treatment levels pigments of this invention will exhibit low gloss, high oil absorption characteristics and will manifest substantially higher emulsion hiding power properties.

I claim as my invention:

1. As a new pigment composition, a $TiO_2$ pigment containing as an ingredient from 0.1 to 10% by weight $Al_2O_3$ based on the $TiO_2$ content of the said pigment and formed by co-oxidation of the corresponding chlorides, and bearing a porous coating consisting essentially of from 1–25% by weight of $SiO_2$, based on the $TiO_2$ content of said pigment.

2. As a new pigment composition, a $TiO_2$ pigment containing as an ingredient from 0.1 to 10% by weight $Al_2O_3$ based on the $TiO_2$ content of the said pigment and formed by co-oxidation of the corresponding chlorides, and bearing a porous coating consisting essentially of from 2–5% by weight of $SiO_2$, based on the $TiO_2$ content of said pigment.

3. As a new pigment composition co-oxidized $TiO_2$-$Al_2O_3$ containing 0.1–10% $Al_2O_3$, based on the $TiO_2$ present, said pigment containing a porous coating consisting essentially of from 1–25% by weight of $SiO_2$ based on the $TiO_2$ content of said pigment.

4. As a new pigment composition co-oxidized $TiO_2$-$Al_2O_3$ containing from 0.5 to 3.5% $Al_2O_3$, based on the $TiO_2$ content, said pigment being completely coated with a porous coating consisting essentially of from 2–5% by weight of $SiO_2$ based on the $TiO_2$ content of said pigment.

5. A process for producing a porous coated pigment of $TiO_2$ containing as an ingredient from 0.1 to 10% by weight $Al_2O_3$ based on the $TiO_2$ content of the said pigment and formed by co-oxidation of the corresponding chlorides, comprising forming a hot 40–70° C., acidic, aqueous slurry suspension containing 20–40% by weight of said pigment, incorporating a water-soluble silicate solution therein with accompanying agitation until the amount of $SiO_2$ present ranges from 1–25%, based on the $TiO_2$ present, aging the resulting mixture at a pH of at least 9 and thereafter adjusting said pH to not to exceed 6.5, thence aging of the acidified slurry for from 20 to 60 minutes, and recovering the resulting $SiO_2$ coated pigment product.

6. A process for producing a porous coated pigment of $TiO_2$ containing as an ingredient from 0.1 to 10% by weight $Al_2O_3$ based on the $TiO_2$ content of the said pigment and formed by co-oxidation of the corresponding chlorides, comprising forming a hot 40–70° C., acidic, aqueous slurry suspension containing 20–40% by weight of said pigment, incorporating an alkali metal silicate solution therein with accompanying agitation until the amount of $SiO_2$ present ranges from 2–5%, based on the $TiO_2$ present, aging the resulting mixture at a pH of at least 9 and thereafter adjusting said pH to a range of 6–6.5, thence aging of the acidified slurry for from 20 to 60 minutes, and recovering the resulting $SiO_2$ coated pigment product.

7. A process for producing a porous coated pigment of $TiO_2$ containing as an ingredient from 0.1 to 10% by weight $Al_2O_3$ based on the $TiO_2$ content of the said pigment and formed by co-oxidation of the corresponding chlorides, comprising forming a hot 40–70° C., acidic, aqueous slurry suspension containing 20–40% by weight of said pigment, incorporating a sodium silicate solution therein with accompanying agitation until the amount of $SiO_2$ present ranges from 2–5%, based on the $TiO_2$ present, aging the resulting mixture at a pH of at least 9 and thereafter adjusting said pH to a range of 6–6.5, thence aging of the acidified slurry for from 20 to 60 minutes, and recovering the resulting $SiO_2$ coated pigment product.

8. A process for producing a porous coated pigment of $TiO_2$ containing as an ingredient from 0.1 to 10% by weight $Al_2O_3$ based on the $TiO_2$ content of the said pigment and formed by co-oxidation of the corresponding chlorides, comprising forming a hot 40–70° C., acidic, aqueous slurry suspension containing 20–40% by weight of said pigment, incorporating therein with mild agitation a sodium silicate solution containing 100–300 grams/liter $SiO_2$ until the $SiO_2$ content present ranges from 2–5%, based on the $TiO_2$ present, aging the resulting mixture at a pH of from 9 to 11, with accompanying agitation for a period of about 30 minutes, adjusting the pH of said mixture through mineral acid addition to a pH in the range of from 6–6.5, subjecting the neutralized slurry to further aging for a period of about 30 minutes, and then filtering, washing, drying and grinding the resulting $SiO_2$ coated pigment product.

References Cited

UNITED STATES PATENTS

| | | | |
|---|---|---|---|
| 2,296,636 | 9/1942 | Hanahan | 106—300 |
| 2,671,031 | 3/1954 | Whately | 106—300 |
| 2,780,558 | 2/1957 | Wilcox | 106—300 |
| 2,885,366 | 5/1959 | Iler | 106—300 |
| 3,146,119 | 8/1964 | Ritter | 106—300 |
| 3,251,705 | 5/1966 | Rieck et al. | 106—300 |

TOBIAS E. LEVOW, *Primary Examiner.*

S. E. MOTT, *Assistant Examiner.*